United States Patent [19] 
Morikawa et al.

[11] Patent Number: 4,969,435
[45] Date of Patent: Nov. 13, 1990

[54] IDLE SPEED CONTROL SYSTEM FOR A TWO-CYCLE ENGINE

[75] Inventors: Koji Morikawa, Musashino; Hideo Watanabe, Tokyo, both of Japan

[73] Assignee: Fuji Jukogyo Kabushiki Kaisha, Tokyo, Japan

[21] Appl. No.: 383,804

[22] Filed: Jul. 21, 1989

[30] Foreign Application Priority Data

Jul. 29, 1988 [JP] Japan .................................. 63-191122

[51] Int. Cl.[5] ........................................... F02D 41/16
[52] U.S. Cl. ..................................... 123/339; 123/533
[58] Field of Search ..................... 123/73 C, 339, 531, 123/533

[56] References Cited

U.S. PATENT DOCUMENTS

| | | | |
|---|---|---|---|
| 4,700,675 | 10/1987 | Otobe et al. | 123/339 |
| 4,716,871 | 1/1988 | Sakamoto et al. | 123/339 |
| 4,780,827 | 10/1988 | Fujimori et al. | 123/339 X |
| 4,785,780 | 11/1988 | Kawai | 123/339 |
| 4,794,901 | 1/1989 | Hong et al. | 123/533 |

Primary Examiner—Willis R. Wolfe
Attorney, Agent, or Firm—Martin A. Farber

[57] ABSTRACT

A two-cycle engine has a scavenge pump provided in an intake passage, and a fuel/air injector provided for injecting fuel directly in a cylinder of the engine together with air. A control unit has a calculator for calculating quantities of fuel and air injected from the fuel/air injector and for producing a fuel injection pulse width signal and an air injection pulse width signal based on the calculated quantities. Engine speed at idling state is compared with a desired idle speed and an error signal is produced. At least one of the pulse width signals is corrected with a correction value for controlling the injection quantity so as to cause the idle speed to converge to the desired idle speed.

9 Claims, 8 Drawing Sheets

FIG. 8

IDLE SPEED CONTROL SYSTEM FOR A TWO-CYCLE ENGINE

BACKGROUND OF THE INVENTION

The present invention relates to a two-cycle automotive engine with a direct fuel injection system, and more particularly to a system for controlling engine speed to a predetermined speed at an idling state of the engine.

In the two-cycle engine, one cycle of the operation in one cylinder is completed within one revolution of a crankshaft. Accordingly, sufficient amount of air is not drawn in the cylinder.

In a crank-case-scavenged two-stroke engine, a vacuum is produced in an enclosed crankcase of the engine to draw in fresh air when a piston ascends. When the piston descends, burned gas is discharged through an exhaust port while the fresh air in the crankcase is admitted into a cylinder, thereby scavenging the cylinder. On the other hand, a throttle valve is provided in an intake system for the control of engine load. The quantity of intake air is adjusted in accordance with the opening degree of the throttle valve.

However, at light engine load, since the intake air quantity is small, the scavenging becomes insufficient, resulting in misfiring and hence in an irregular engine operation. In addition, a torque characteristic corresponding to the engine operating conditions becomes uneven. Moreover, at heavy engine load, the volume of the crankcase is insufficient for scavenging. Hence, it is desired to increase the scavenging efficiency and prevent fuel from escaping from the cylinder through an exhaust port.

In order to resolve such a problem a two-cycle engine with a separate scavenge pump and a direct fuel injection system is used. Japanese patent application Laid-Open No. 57-203821 discloses a two-cycle engine which is provided with a scavenge pump and a fuel injector. The scavenge pump is provided in a scavenge port and driven at the same speed as the crankshaft to generate a scavenge pressure thereby delivering a sufficient amount of fresh air into the cylinder. The fuel injector is provided in a combustion chamber of the engine for providing a direct fuel injection system so as to prevent the fuel from escaping through the exhaust port.

However, in this disclosed system, control of the load on the engine, in particular in an idling state is not described. In order to control the engine load, a throttle valve may be provided upstream of the scavenge pump for adjusting the quantity of scavenge air. Since the scavenge air quantity is small at the idling state, it is necessary to prevent increase of pumping loss.

Japanese patent application Laid-Open No. 60-501963 discloses a direct fuel injection system in which fuel accumulated in a fuel injector is injected into a cylinder by compressed air. In the system, the air-fuel ratio of the mixture can be effectively controlled in accordance with fuel and air although the quantity of scavenge air is small at idling state.

SUMMARY OF THE INVENTION

The object of the present invention is to provide an idle speed control system for a two-cycle engine in which a direct fuel injection system and a scavenge pump are provided so as to properly control the engine speed at the idling state.

According to the present invention, there is provided a system for controlling idle speed of a two-cycle automotive engine having at least one cylinder, a scavenge port, an intake passage communicated with said scavenge port, a fuel/air injector provided for injecting fuel directly in the cylinder together with air, a scavenge pump provided in said intake passage for supplying air to the cylinder, and a control unit having calculator means for controlling guantities of fuel and air injected from the fuel/air injector.

The system comprises an engine speed sensor for detecting engine speed and for producing an engine speed signal, idling state detecting means for detecting an idling state of the engine and for producing an idling state signal, and idle speed determining means responsive to the idling state signal for producing an idle speed or error signal for correcting at least one of the injection quantities so as to cause the idle speed to converge to the desired idle speed.

These and other objects and features of this invention will become understood from the following description with reference to the accompanying drawings.

DETAILED DESCRIPTION OF THE PREFERRED EMBODIMENTS

Figure 1:
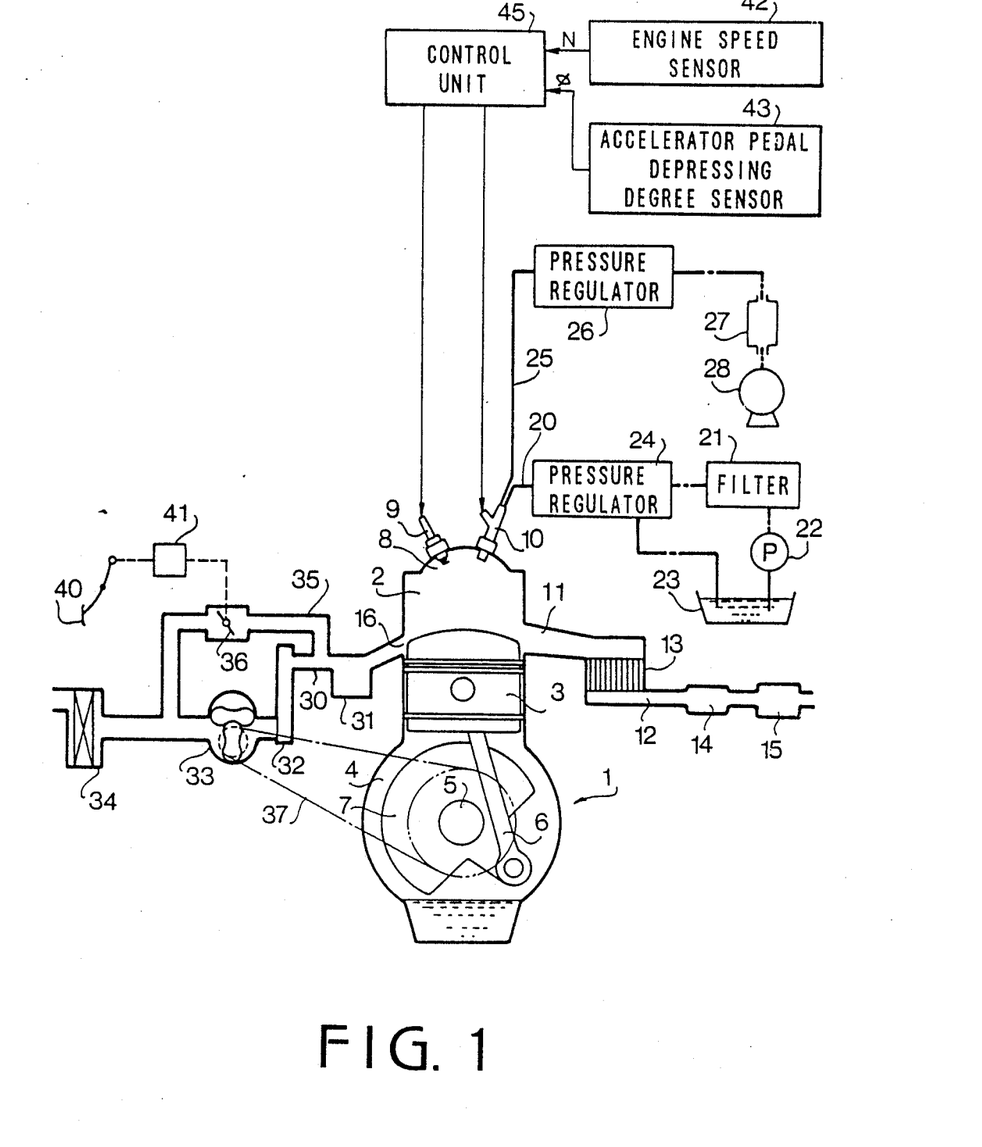
FIG. 1 is a schematic diagram of a two-cycle engine of the present invention.

Referring to FIG. 1, a two-cycle engine 1 comprises a cylinder 2, a piston 3 provided in the cylinder 2, a connecting rod 6 connected with the piston 3 and a crankshaft 5 disposed in a crankcase 4. A counterweight 7 is mounted on the crankshaft 5 so as to reduce the inertia of the piston 3 reciprocating in the cylinder 2.

In a wall of the cylinder 2, an exhaust port 11 and a scavenge port 16 are formed at a 90 degree angular disposition or opposing one another. The ports 11 and 16 are adapted to open at a predetermined timing with respect to the position of the piston 3.

A fuel/air injector 10 and a spark plug 9 are provided on a top of a combustion chamber 8 of the cylinder 2. The fuel/air injector 10 is a type where a predetermined amount of fuel is injected together with air by compressed air in the form of an air-fuel mixture. Fuel in a fuel tank 23 is supplied to the injector 10 through a fuel passage 20 having a filter 21, a pump 22 and a pressure regulator 24 for constantly maintaining the fuel at a predetermined low fuel pressure. The fuel is mixed with air supplied to the injector 10 through a compressor 28 passing through an air passage 25 having an accumulator 27 and a pressure regulator 26.

The engine 1 is supplied with air through an air cleaner 34, a displacement scavenge pump 33, an intercooler 32 for cooling scavenge air, and an intake pipe 30 having a scavenge chamber 31 for absorbing scavenge pressure waves when the scavenge port 16 is opened or closed. A bypass 35 is provided around the scavenge pump 33 and the intercooler 32. The bypass 35 is provided with a control valve 36. Exhaust gas of the engine 1 is discharged passing through the exhaust port 11, an exhaust pipe 12 having a catalytic converter 13, an exhaust chamber 14 and a muffler 15.

The scavenge pump 33 is operatively connected to the crankshaft 5 through a transmitting device 37 comprising an endless belt running over a crank pulley and a pump pulley. The scavenge pump 33 is driven by the crankshaft 5 through the transmitting device 37 for producing a scavenge pressure. An accelerator pedal 40 is operatively connected with the control valve 36 through a valve controller 41. The opening degree of the control valve 36 is controlled by the controller 41 so as to be inversely proportional to the depressing degree of the accelerator pedal 40. Further, an engine speed sensor 42 and an accelerator pedal depressing degree sensor 43 are provided for determining engine operating conditions.

Output signals from the sensors 42 and 43 are supplied to a control unit 45 which feeds an ignition signal, an air injection pulse signal and a fuel injection pulse signal to the spark plug 9 and the injector 10, respectively.

Figure 2:
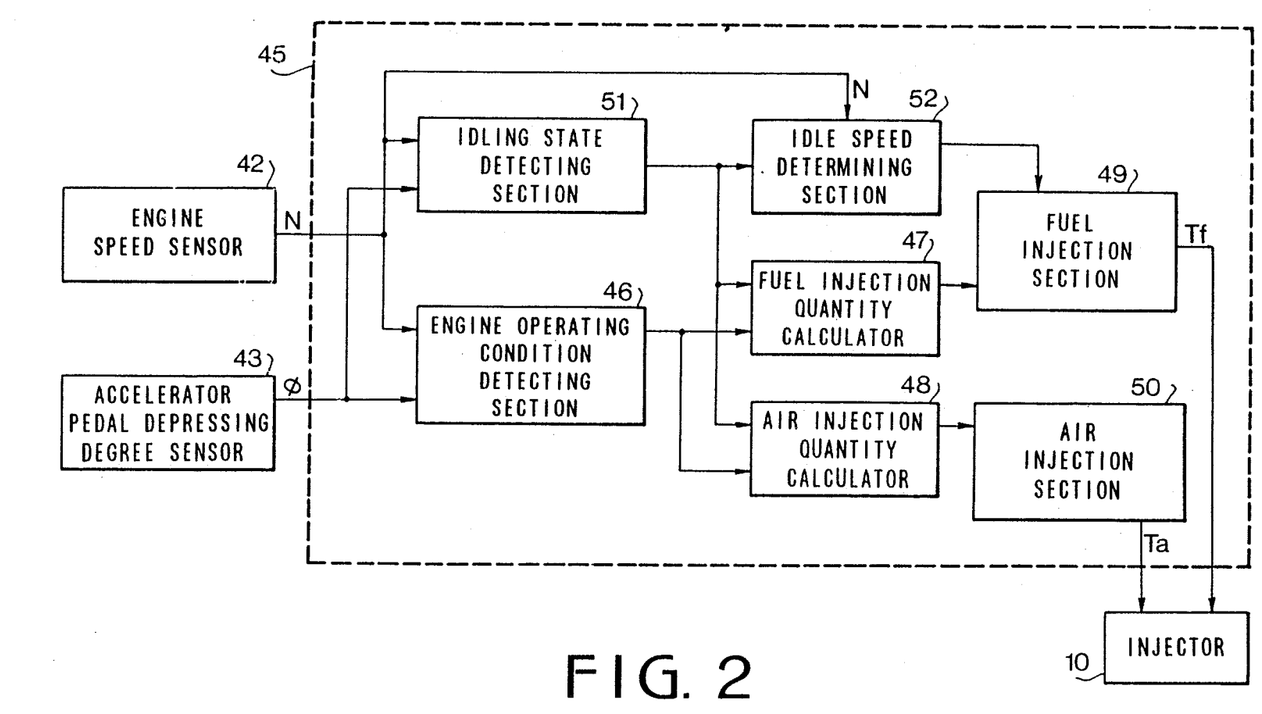
FIG. 2 is a block diagram showing a control unit according to the present invention.

Referring to FIG. 2, the control unit 45 has an engine operating condition detecting section 46 to which engine speed N from the engine speed sensor 42 and accelerator pedal depressing degree $\phi$ from the accelerator pedal depressing degree sensor 43 are applied. An output signal of the engine driving condition detecting section 46 is applied to a fuel injection quantity calculator 47 which calculates the quantity of injected fuel in accordance with a desired air-fuel ratio derived from a memory in dependency on engine operating conditions. The output signal from the section 46 is further applied to an air injection quantity calculator 48 which calculates the quantity of injected air corresponding to the calculated quantity of fuel. The calculated fuel quantity is applied to a fuel injection section 49 in which the fuel quantity is converted into a fuel injection pulse width signal Tf. The calculated air quantity is applied to an air injection section 50 in which the air quantity is converted into an air injection pulse width signal Ta. These pulse width signals Tf and Ta are applied to the fuel/air injector 10 for driving the injector.

The control unit 45 further has an idling state detecting section 51 to which engine speed N and accelerator pedal depressing degree $\phi$ are applied. The idling state detecting section 51 detects the idling state of the engine when both of the engine speed N and accelerator pedal depressing degree $\phi$ are lower than predetermined values and produces an idle signal. The idle signal is applied to the fuel injection calculator 47 and the air injection calculator 48, for calculating the quantity of injection fuel and the quantity of injection air at the idling state with reference to data derived from a table. The idle speed is applied to an idle speed determining section 52 which is applied with the engine speed N and the idle signal. The idle speed determining section 52 determines the difference between a desired idle speed Nd and the engine speed N. A resultant signal (idle speed signal) from the idle speed determining section 52 is applied to the fuel injection pulse signal output section 49. When Nd<N, the fuel injection pulse width signal Tf is decreased by a correction value $\alpha$ (Tf$-\alpha$). (When Nd>N, the pulse width signal Tf is increased by the correction value $\alpha$ (Tf$+\alpha$).

The operation of the two-cycle engine is described hereinafter.

The air supplied from the scavenge pump 33 and cooled at the intercooler 32 is returned to the inlet side of the scavenge pump 33 through the bypass 35. Since the opening degree $\theta$ of the control valve 36 is controlled to be inversely proportional to the depressing degree $\phi$ of the accelerator pedal 40, when the depressing degree $\phi$ of the accelerator pedal is small, the control valve 36 is opened greatly. As a result, a large amount of air is returned to the inlet side of the scavenge pump 33. Thus, a small amount of air, which corresponds to the small accelerator pedal depressing degree, flows into the cylinder 2 for scavenging without causing pumping loss. As the depressing degree $\phi$ increases, the quantity of fresh air forced into the cylinder 2 increases with closing of the control valve 36.

When the piston 3 reaches a position close to the bottom dead center as shown in FIG. 1, the scavenge port 16 opens as well as the exhaust port 11 so that intake air, the quantity of which depends on the position of the accelerator pedal 40, is delivered by the scavenge pump 33 into the cylinder 2 through the intercooler 32 and the scavenge port 16. Consequently, burned gas in the cylinder 2 is scavenged so that fresh intake air is admitted therein in a short time. During the compression stroke, the piston 3 rises, closing both ports 11 and 16. A dose of fuel accumulated in the fuel/air injector 10 in accordance with the fuel injection pulse signal from the control unit 45 is injected by the compressed air, which is supplied in accordance with the air pulse signal, as air-fuel mixture. The mixture is swirling in the combustion chamber with the scavenging air and ignited by the spark plug 9 immediately before the top dead center. After the explosion, the piston 3 descends for the power stroke. Accordingly, the exhaust port 11 is opened so that burned gas in the cylinder 2 which is still under high pressure escapes. The piston 3 further descends, thereby returning to the afore-described intake stroke where the cylinder 2 is scavenged.

The engine operating condition is detected in the engine operating condition detecting section 46 in accordance with engine speed N and accelerator pedal depressing degree $\phi$. Quantities of injected fuel and air are calculated in the fuel injection quantity calculator 47 and the air injection quantity calculator 48, respectively. Based on the calculated quantities, the fuel injection section 49 and air injection section 50 produce the fuel injection pulse width signal Tf and the air injection pulse width signal Ta, which are applied to the injector 10. Thus, the air-fuel ratio of the mixture is controlled to be substantially equal to the desired air-fuel ratio.

Figure 3:
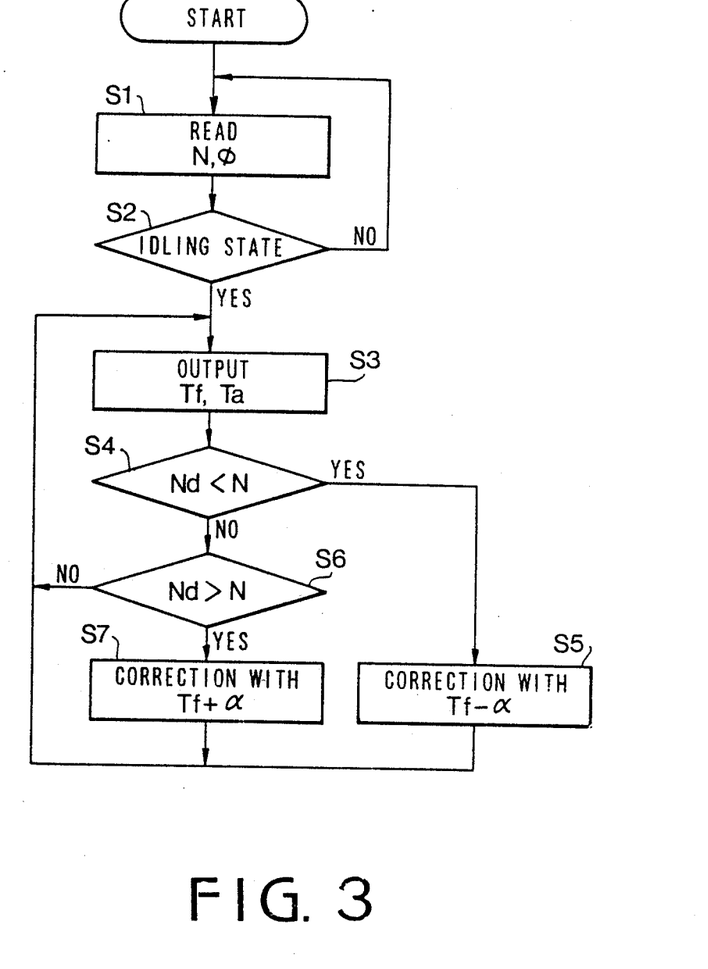
FIG. 3 is a flowchart showing an operation of the system.
Figure 4A:
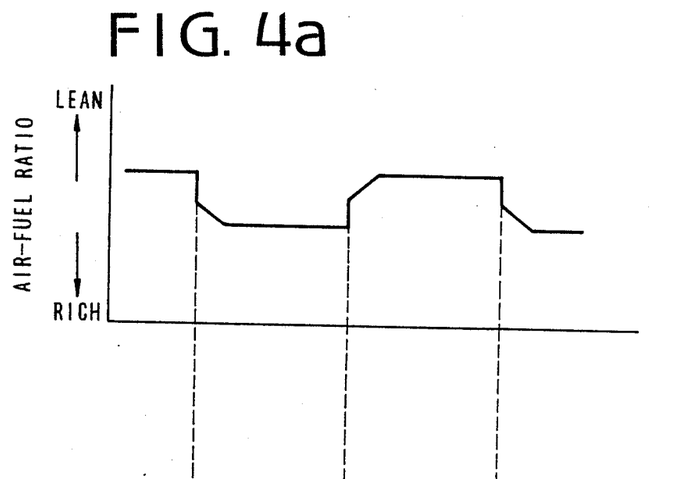
FIGS. 4a and 4b are graphs showing time charts for idle speed control.
Figure 4B:
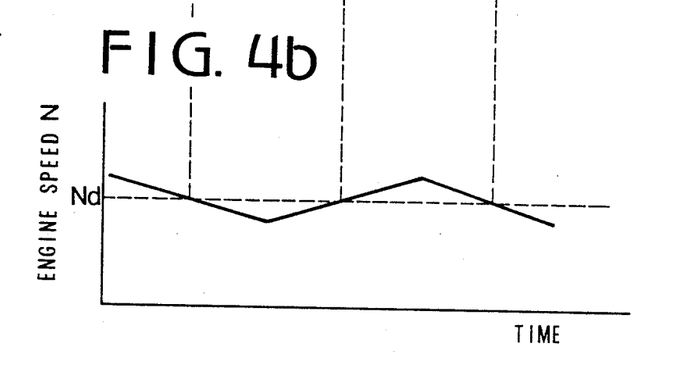

The operation of the system at the idling state is described with reference to the flowchart of FIG. 3. The engine speed N and the accelerator pedal depressing degree $\phi$ are read at a step S1. If the idling state is detected in the idling state detecting section 51 in accordance with signals N and $\phi$ at a step S2, quantities of injected fuel and air at the idling state are calculated in the fuel injection quantity calculator 47 and the air injection quantity calculator 48 and the fuel injection pulse width signal Tf and the air injection pulse width signal Ta are supplied to the injector 10 at a step S3. The scavenge air from the scavenge pump 33 is controlled to constantly maintain an optimum quantity in accordance with the control valve 36, so that a predetermined air-fuel ratio of the mixture is provided. The variation of the engine speed N is determined in the idle speed determining section 52 at a step S4. If the idle speed N is higher than the desired idle speed Nd(Nd<N), the program goes to a step S5 where the fuel injection pulse width signal Tf is corrected to decrease the pulse width with the correction value $\alpha$ (Tf$-\alpha$) in the fuel injection pulse width signal output section 49. The quantity of fuel from the fuel/air injector 10 is reduced to make the air-fuel ratio lean as shown in FIG. 4a. Thus, the engine speed N is reduced to converge to the desired idle speed. Unless Nd<N at step S4, the program proceeds to a step S6 where Nd>N is determined. If Nd>N, the fuel injection pulse width signal Tf is corrected at a step S7 to increase the pulse width by $\alpha$ (Tf$+\alpha$). Thus, the air-fuel ratio becomes rich to increase the engine speed N. Accordingly, the idle speed N is controlled to the desired idle speed Nd with the feedback control.

Figure 5:
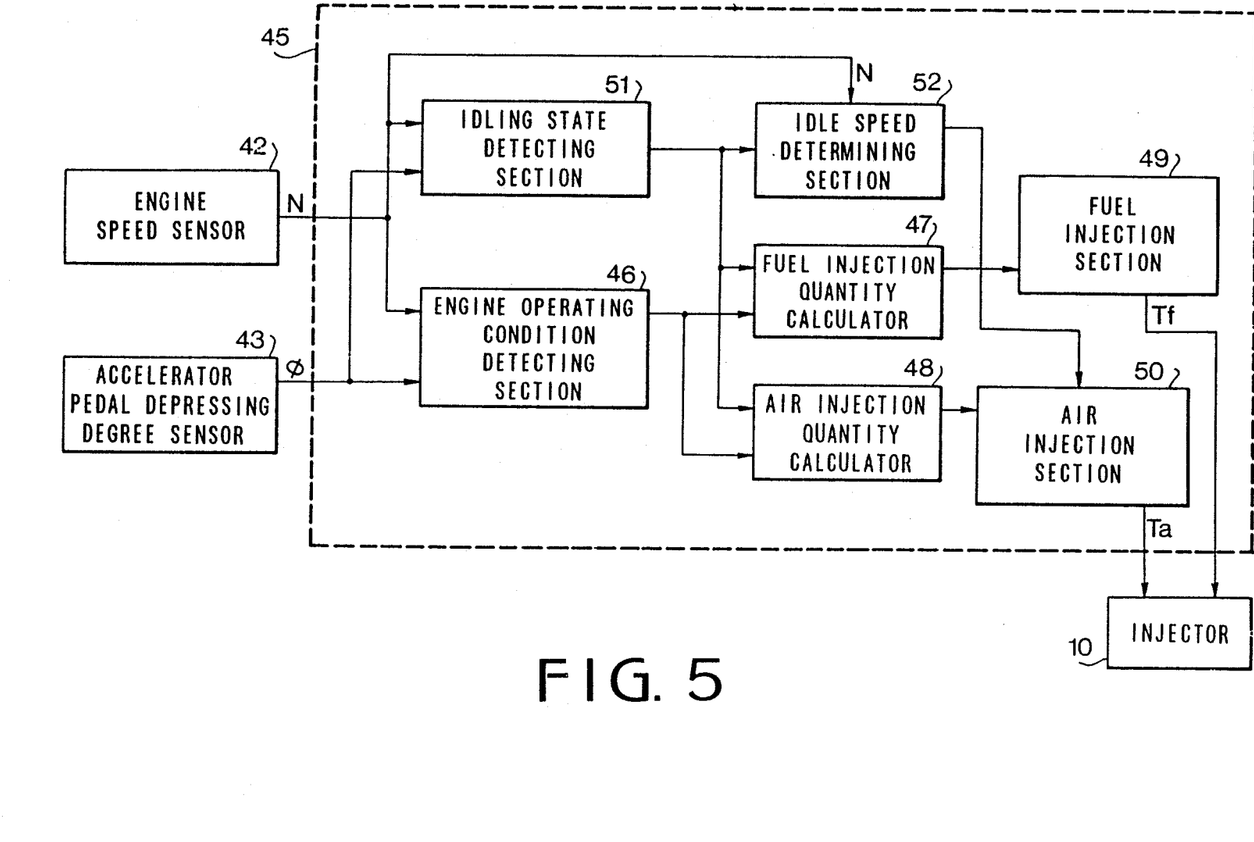
FIGS. 5 is a block diagram showing a second embodiment of the present invention.
Figure 6:
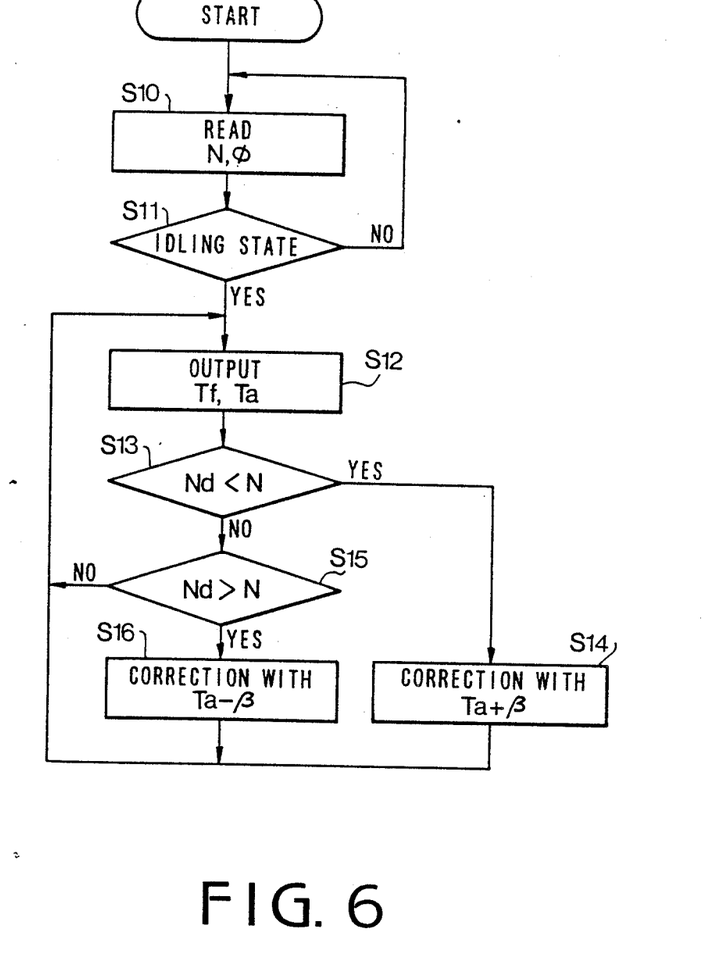
FIG. 6 is a flowchart showing an operation of the second embodiment.

FIGS. 5 and 6 show a second embodiment of the present invention. In the second embodiment, when the idling state is detected, the output signal from the idle speed determining section 52 is applied to the air injection section 50 for correcting the air injection pulse width signal Ta. As shown in FIG. 6, if Nd<N at step S13, the air injection pulse width signal Ta is corrected at a step S14 to increase the pulse width by $\beta$. The air-fuel ratio becomes lean and hence the idle speed decreases. If Nd>N at a step S15, the air injection pulse width signal Ta is corrected at a step S16 to decrease the pulse width by $\beta$. Thus, the air fuel ratio becomes rich to increase the engine speed N.

Accordingly, the idle speed is controlled in the same manner as the previous embodiment.

Figure 7:
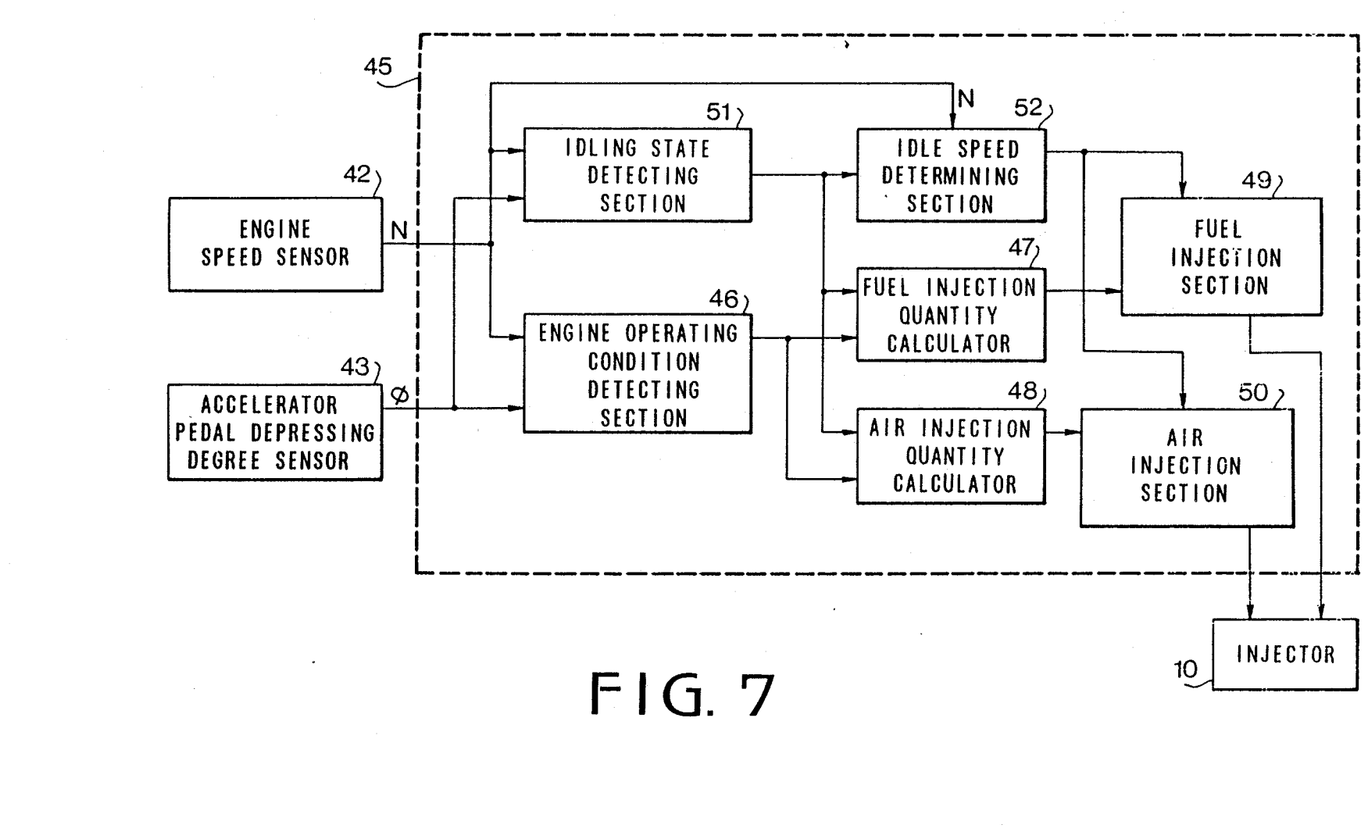
FIG. 7 is block diagram showing a third embodiment of the present invention.
Figure 8:
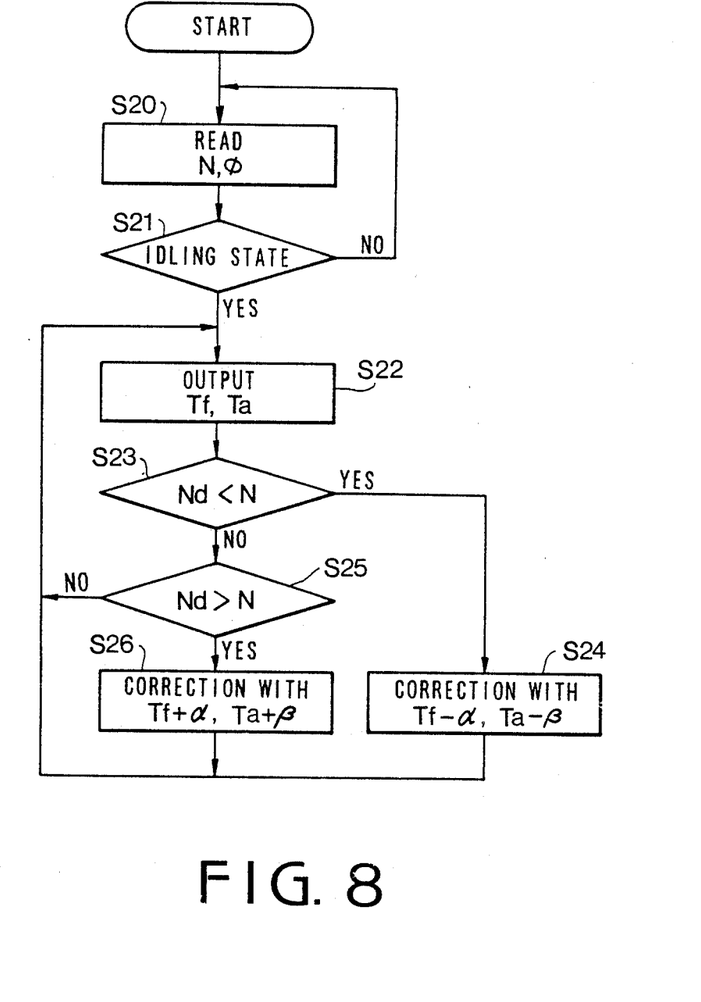
FIG. 8 is a flowchart showing an operation of the third embodiment.

FIGS. 7 and 8 show a third embodiment of the present invention, in which the fuel injection pulse width signal Tf in the section 49 and the air injection pulse width signal Ta in the section 50 are simultaneously corrected in dependency on the signal from the idle speed determining section 52 at the idling state. If Nd<N at a step S23, the fuel injection pulse width signal Tf and the air injection pulse width signal Ta are simultaneously corrected at a step S24 to decrease the quantity of the air-fuel mixture in accordance with the correction of Tf$-\alpha$ and Ta$-\beta$. Thus, the engine speed N is reduced. If Nd>N at a step S25, the fuel and air pulse width signals Tf and Ta are simultaneously corrected at a step S26 to increase the quantity of air-fuel mixture in accordance with Tf$+\alpha$ and Ta$+\beta$, thereby increasing engine speed N.

In the third embodiment, it is preferable to control the air-fuel ratio to be constant.

In accordance with the present invention, at the idling state of the engine, the idle speed of the engine is controlled by changing the air-fuel ratio of the mixture or the quantity of the air-fuel mixture, thereby improving stability of the idle speed. Since the air-fuel ratio of the mixture or the quantity of the mixture is controlled by both the fuel and air, a fine control is easily performed. The system of the present invention has rapid response and less overshooting compared with a system in which the quantity of air is controlled in accordance with the throttle valve.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. In an idle speed control system for a two cycle engine having a cylinder with a scavenge port and an exhaust port, an intake passage communicated with said scavenge port, an exhaust passage connected to said exhaust port, a fuel/air injection for directly and simultaneously injecting an amount of fuel and air into said cylinder, a scavenge pump provided in said intake passage for supplying compressed air into said cylinder, a control valve interposed in a bypass of said intake passage, an engine speed sensor for detecting engine speed and for producing a corresponding engine speed signal, and an accelerator position sensor for detecting depressing degree of an accelerator pedal operatively connected with said control valve and for producing a corresponding degree signal, the improvement of the system which comprises:

idling state detecting means responsive to said engine speed and said degree signals for detecting an idling state of said engine by comparing said engine speed and degree signals with values stored in a memory of engine speed and depressing degree of said accelerator pedal representing the idling state and for producing an idling state signal when said signals correspond with said values representing the idling state;

engine operating condition detecting means responsive to said engine speed and said degree signals for detecting an engine operating condition and for producing a corresponding engine operating condition signal;

idle speed determining means responsive to said engine speed signal and said idling state signal and for determining an idle speed and for producing a corresponding idle speed signal;

fuel control means responsive to said idle state and said engine operating condition signals for controlling a quantity of fuel injection to said injector; and air control means responsive to said idle state and said engine operating condition signals for controlling quantity of air injection in combination with said fuel injection to said injector and at least one of said control means being responsive to said idle speed signal for correcting the corresponding quantity of injection, so that the engine speed immediately converges to an optimum idling engine speed without overshooting.

2. The idle speed control system according to claim 1, wherein
said fuel control means is responsive to said idle speed signal.

3. The idle speed control system according to claim 1, wherein
said air control means is responsive to said idle speed signal.

4. The idle speed control system according to claim 1, wherein
said fuel and air control means are responsive to said idle speed signal.

5. The idle speed control system according to claim 4, wherein
said fuel and air control means control the air/fuel ratio to be constant.

6. The idle speed control system according to claim 1, wherein said at least one control means corrects the corresponding quantity of injection in dependency on said idle speed signal.

7. The idle speed control system according to claim 6, wherein
said corresponding quantity of injection is increased or decreased by a correction value when the detected engine speed is greater or less than a desired idle speed.

8. The idle speed control system according to claim 7, wherein
said correction value is dependent on the difference between said desired idle speed and the detected engine speed.

9. The idle speed control system according to claim 1, wherein
one of said control means calculates the corresponding quantity of injection in accordance with a desired air/fuel ratio derived from a memory in dependency on said engine operating condition signal, and
the other of said control means calculates its corresponding quantity of injection corresponding to the first-mentioned corresponding quantity of injection.

* * * * *